Nov. 2, 1965  J. J. LANDY  3,215,539
METHOD OF STERILIZING FOOD IN SEALED CONTAINERS
Filed Aug. 9, 1962
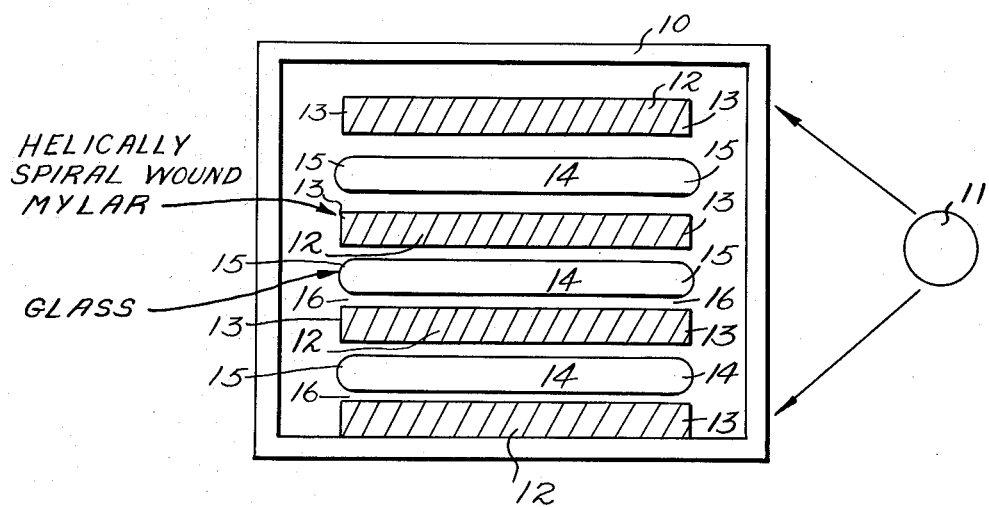
INVENTOR
JEROME J. LANDY
BY Cushman, Darby & Cushman
ATTORNEYS

United States Patent Office 3,215,539
Patented Nov. 2, 1965

3,215,539
METHOD OF STERILIZING FOOD
IN SEALED CONTAINERS
Jerome J. Landy, 13700 SW. 78th Court, Miami, Fla.
Filed Aug. 9, 1962, Ser. No. 215,970
9 Claims. (Cl. 99—221)

This invention relates to the art of sterilization. More particularly, this invention relates to the preparation of sterile food and other materials.

One advantageous field of application of my invention is in the sterilization of foodstuffs which are or can be contaminated with live micro-organisms, including their spores. However, this invention is not limited to foods, but is useful in the sterilization of other materials.

The most reliable method conventionally employed to sterilize food and other materials contaminated by micro-organisms and their spores, cysts and other thermal-resistant forms is to expose the same to heat. Particularly when sterilizing food, if this exposure is excessive in time and/or temperature, undue destruction of vitamins and other essential food elements occurs. Undesirable physical changes may take place also.

Sterile food and other materials are particularly necessary in many fields of research, for example, for use in the study of experimentally produced diseases. Laboratory animals, such as hamsters, rats, mice, guinea pigs, chickens, dogs, pigs, monkeys etc. are used in this research, and it is vital that the animals be fed sterile food and maintained in a controlled environment. Thus, materials which come into contact with the animals, such as litter, cages, and other fomites, must also be sterile. Furthermore, the materials must be kept in a sterile condition until and after the time of introduction into the cages as part of the rigid method of control available by this invention. This may be accomplished by keeping the sterile materials in a sealed container or package. Another advantage of this procedure is that the packages may be handled in commerce and transported from one place to another while keeping the contents sterile.

The direct penetration of steam under pressure is conventionally utilized to decrease the time and temperature necessary to kill all micro-organisms in a material to be sterilized. This procedure is usually carried out in an autoclave. However, if the material is within a vapor-tight container, for example, sealed plastic, glass or metal, direct penetration of steam is impossible since steam cannot penetrate the container and heating can occur only from the outer surfaces inwardly, primarily by conduction. Therefore, the package contents must be heated at a gradually rising temperature for a considerable time before a sterilization condition can be achieved throughout the contents.

An example of this is a hermetically sealed plastic package containing aggregates of food contaminated by given species of temperature-resistant spores. With a package of aggregates approximately one inch or greater in thickness, heated in an oven or autoclave maintained at a temperature of 120° C., one hour or more is required for consistent sterilization. Thus, the time for sterilizing is extended beyond permissible limits in terms of preservation of essential nutritional factors. Therefore, if vapor-tight packages are used, another method is necessary to obtain more rapid heating of the package contents.

It is, therefore, an object of this invention to provide a method for the sterilization of foodstuffs and other materials which overcomes the disadvantages of the prior art.

It is another object of this invention to provide such a method whereby foods and other materials which are or may be contaminated with micro-organisms, such as spores, are rendered sterile in a relatively short period of time.

Still another object of this invention is to provide such a method wherein the materials may be sterilized in situ within a vapor-tight container without the use of an autoclave.

A further object of this invention is to provide a method wherein the materials are sterilized in a vapor-tight container of a form suitable for marketing.

A still further object of this invention is to provide a method for the sterilization of foodstuffs wherein undue destruction of vitamins and other essential food elements is completely avoided or substantially reduced.

Yet another object of this invention is to provide a package containing food or other materials sterilized in situ, which package is suitable for marketing.

Still further objects and the entire scope of applicability of the present invention will become apparent from the detailed description given hereinafter; it should be understood, however, that the detailed description, while indicating preferred embodiments of the invention, are given by way of illustration only, since various changes and modifications within the spirit and scope of the invention will become apparent to those skilled in the art from this detailed description.

It has been found that the above objects may be attained by rapidly generating sterilizing steam and pressure in situ within a vapor-tight package containing material to be sterilized. Electromagnetic energy, for example, microwave energy, infrared energy, etc., is directed into the package and acts as the source of energy for this rapidly generated sterilizing steam.

The packages or containers must be formed of materials which are transparent to the given source of energy. Suitable materials are glass and most commercially available plastics, such as Mylar, a polyethylene terephthalate resin available from the E. I. du Pont de Nemours & Co. Other plastics having adequate strength and thermal stability can be used, many of which are now commercially available, e.g., "Teflon".

Heat is generated within the package by the coupling of electromagnetic energy with the moisture within the food or other materials. The moisture should be present in an amount to allow for the generation of an adequate steam supply to accomplish sterilization, e.g., at least about 2% or more by weight of said material which may be contained in e.g. low melting point fat (melting below 120° C.), water, etc. or added e.g. as water to the food or other substances prior to sealing within the package.

The vapor-tight package is maintained at a substantially constant volume so that both temperature and pressure within the package increase as the electromagnetic energy is absorbed and sterilization proceeds uniformly and rapidly. A package having relatively flexible sides and enclosed within a rigid form transparent to the electromagnetic energy during the sterilizing process can also be used. When the package is formed of Mylar, a thickness thereof of about 2 mils gives sufficient rigidity and strength to maintain constant volume at increased pressures and temperatures. The dimensions of the package and the quantity of material therein are controlled to insure uniform heating. In this way, optimal temperatures and pressures may be rapidly reached and maintained until sterilization is achieved.

The standard generally accepted method for the destruction of live micro-organisms is the direct penetration of steam under pressure in an autoclave. When vapor-tight packages are placed in an autoclave or hot air oven steam can not penetrate to heat the contents. Therefore, energy is gained by conduction. There is a considerable time lag before the contents in the center of such a package reaches a sterilizable temperature and pressure. For example, when the vapor-tight package is filled with aggregates of food to a thickness of greater than one inch, it takes up to one hour or more to reach a sterilizing temperature of 120° C. and a pressure of 28.8 pounds per square inch absolute. Destruction of vital food substances occurs during the interval of time necessary to reach the constant pressure and uniformly heat the material throughout to the temperature required for sterilization. By following the teachings of the present invention, the required temperature and pressure have been accomplished without an autoclave in less than two minutes and thereafter these conditions are then maintained for approximately an additional fifteen or twenty minutes or until uniform sterilization is accomplished throughout the material without degrading the same. This has been done by directing electromagnetic energy into the vapor-tight packages, which packages are maintained at constant volume during sterilization and tightly sealed since they contain materials contaminated by micro-organisms, whereby the sterilized packaged products are held in this condition until used, e.g., placed in the cages of the animals to be fed. Complete sterilization has been achieved with a minimal loss of vitamins and other essential food elements.

Another method of accomplishing this sterilization is to rapidly reach the sterilizing temperature throughout the container with electromagnetic energy and then maintain this temperature within the container by keeping these packages for a sufficient time in an environment where the ambient temperature is sufficient for sterilizing, for example 120° C.

As indicated above, the materials to be sterilized must contain adequate moisture to allow the generation of steam. The pressure within the vapor-tight container is raised above atmospheric pressure, 14.7 pounds per square inch absolute and the temperature above that of boiling water, 100° C. (both of these measured at sea level). A direct relationship exists between the degree of elevation of pressure and temperature and the length of time necessary for sterilization, i.e., the higher the temperature and pressure, the shorter the period of time necessary to sterilize. In one preferred embodiment the pressure is raised to 28.8 pounds per square inch absolute (about 15 pounds per square inch gauge) and the temperature is raised to about 12° C. in less than two minutes and held for approximately fifteen minutes.

The process of this invention may be conveniently carried out in a suitable enclosure, such as a standard microwave oven, e.g., having an energy output of 800 watts. The energy output of the oven can vary with the load to be sterilized. One commercially desirable embodiment is to utilize a conveyor belt type of microwave oven for maximum production. Both the load, in terms of mass of material to be sterilized, and the geometric pattern of the location of the packages, has to be regulated for each type of microwave oven used for sterilizing purposes.

In some instances, it is possible to apply the energy intermittently, e.g., for about five seconds at intervals of approximately five seconds for a total time period to accomplish heating throughout the material and thereby sterilize.

Example 1

About two ounces of guinea pig food ("Purina") known to inherently contain micro-organisms and spores, and having a moisture content of about 7% by weight, was introduced into a glass container measuring one inch in inner diameter and eight inches in length. The container was a glass tube and was sealed at each end so that it was vapor-tight, and placed in a standard microwave oven, and an output energy of about 400 watts was used, the container being spaced in relation to the top, sides and floor of the oven. The oven had an energy capacity of 800 watts. Microwave energy was applied intermittently to the package for twenty minutes at a temperature of 120° C. using about 400 watts energy. After this treatment, the package was opened and the contents were found to be completely sterile.

This example was repeated with the temperature maintained above 120° C., notably 120° to 135° C. and 150° C. The higher temperatures permitted a decrease in the time required for sterilization.

Example 2

Example 1 was repeated using a vapor-tight package formed of spiral wound Mylar having a thickness of 2 mils. The package was fifteen inches long and 0.902 inch in diameter, and sealed at each end. The 800 watt microwave oven of Example 1 was used at the lower setting of 400 watts and the treatment was otherwise the same as in Example 1, the energy being applied for fifteen minutes at about 118° C. Ranges of temperature varying between 118° C. and 121.5° C. were also used in repeated examples. The contents of the package after this treatment were completely sterile.

In the attached drawing the numeral 10 indicates the oven to which is applied the electromagnetic energy 11, notably, microwave energy, infrared energy, as explained above. The sealed tubes containing the material to be sterilized are supported in spaced relation with respect to the oven and to each other in any suitable manner, as shown at 16. The tubes 12 are formed of spirally, helically wound Mylar having sealed ends 13, while the tubes 14 are made of glass having sealed ends 15. The drawing is purely for purposes of illustration, and obviously may be modified by using various types of conventional equipment, the important consideration being, however, that the material of the tubes or other containers or packages retain substantially their original volume, notwithstanding the action of temperature to increase the pressure within the same, as above explained.

When applying the energy intermittently, as above referred to, it can be applied for from about two to sixty seconds at intervals of approximately ten seconds to one hundred second, for a total time period to accomplish heating throughout the material and thereby sterilize.

While I have referred to relatively small containers or packages, it is to be understood that these may be of any desired size and shape, dependent upon the specific purpose for which the packages and the materials therein are to be used, e.g., as sterilized feeds for laboratory animals.

I claim:
1. A method for sterilizing a material containing micro-organisms which comprises: sealing said material having a moisture content adequate to create steam in amount effective to produce sterilization in a vapor-tight package transparent to electromagnetic energy; and maintaining said package at substantially constant volume while directing electromagnetic energy into said package for a period of time sufficient for said electromagnetic energy to vaporize said moisture as steam and for the steam to sterilize said material and kill substantially all of said micro-organisms.

2. A method according to claim 1 wherein the electromagnetic energy is microwave energy.

3. A method according to claim 2 wherein the energy is directed into said package for a period of time which will bring the material rapidly to a uniform sterilizing temperature throughout, and maintaining the material at that temperature until sterilized.

4. A method according to claim 2 wherein the energy is directed into said package initially for less than about 2 minutes.

5. A method according to claim 1 wherein the electromagnetic energy is infrared energy.

6. A method according to claim 1 wherein pressure within the package is rapidly raised to substantially above atmospheric pressure and the temperature of said material is rapidly raised above that of boiling water.

7. A method according to claim 1 wherein pressure within the package is rapidly raised to at least about 28.8 pounds per square inch absolute and the temperature of said material is rapidly raised to at least about 120° C. and these conditions maintained until sterilization occurs in the sealed package.

8. A method according to claim 1 wherein the electromagnetic energy is applied intermittently.

9. A method according to claim 8 wherein the electromagnetic energy is applied for periods of about 5 seconds at intervals of approximately 5 seconds.

References Cited by the Examiner
UNITED STATES PATENTS

| | | | |
|---|---|---|---|
| 2,400,390 | 4/64 | Clunan | 206—46 |
| 2,485,659 | 10/49 | Robertson | 99—217 |
| 2,495,435 | 1/50 | Welch | 99—221 |
| 2,708,636 | 5/55 | Rivoche | 99—221 |
| 2,881,079 | 4/59 | Simjian | 99—217 |
| 2,904,392 | 9/59 | Pomerantz et al. | 21—54 |
| 2,971,641 | 2/61 | Griem | 206—46 |

A. LOUIS MONACELL, *Primary Examiner.*

DOUGLASS J. DRUMMOND, *Examiner.*